(12) United States Patent
Wang et al.

(10) Patent No.: US 10,839,209 B2
(45) Date of Patent: Nov. 17, 2020

(54) IMAGING PROCESSING METHOD FOR SMART MIRROR, AND SMART MIRROR

(71) Applicant: BEIJING XIAOMI MOBILE SOFTWARE CO., LTD., Beijing (CN)

(72) Inventors: Han Wang, Beijing (CN); Jin Han, Beijing (CN); Tao Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 73 days.

(21) Appl. No.: 16/238,229

(22) Filed: Jan. 2, 2019

(65) Prior Publication Data
US 2019/0220661 A1 Jul. 18, 2019

(30) Foreign Application Priority Data
Jan. 16, 2018 (CN) .......................... 2018 1 0040917

(51) Int. Cl.
*G06K 9/00* (2006.01)
*G06K 9/20* (2006.01)
*G02B 5/08* (2006.01)

(52) U.S. Cl.
CPC ........... *G06K 9/00604* (2013.01); *G02B 5/08* (2013.01); *G06K 9/00281* (2013.01); *G06K 9/20* (2013.01)

(58) Field of Classification Search
CPC .. G02B 5/08; G06K 9/00281; G06K 9/00604; G06K 9/20; G06F 3/011; G06F 3/0304
USPC ......................................... 382/117–118, 124
See application file for complete search history.

(56) References Cited

U.S. PATENT DOCUMENTS

| | | | |
|---|---|---|---|
| 10,052,026 B1* | 8/2018 | Tran | G06T 15/20 |
| 2012/0293643 A1* | 11/2012 | Hanna | H04N 5/23212 |
| | | | 348/78 |
| 2016/0011657 A1 | 1/2016 | Estacio | |
| 2019/0146128 A1* | 5/2019 | Cao | G06F 3/0304 |
| | | | 359/838 |

FOREIGN PATENT DOCUMENTS

CN 107247535 A 10/2017

OTHER PUBLICATIONS

Mittal, et al. (A comparative Study and New Model for Smart Mirror), IJSRCSE, pp. 58-61 (Year: 2017).*
EESR of European Patent Application No. 19152130.1, from the European Patent office, dated Jun. 11, 2019.
Iwabuchi Eriko et al., Smart Makeup Mirror: Computer-Augmented Mirror to Aid Makeup Application, Human-Computer Interaction, Part IV, HCII 2009, LNCS 5613, pp. 495-503, 2009.

* cited by examiner

*Primary Examiner* — Daniel G Mariam
(74) *Attorney, Agent, or Firm* — Syncoda LLC; Feng Ma

(57) ABSTRACT

An imaging processing method for a smart mirror includes obtaining biometric parameters of a user; determining whether to perform a processing on an image of the user in the smart mirror according to the biometric parameters, wherein the processing comprises an enlargement processing or a reduction processing; and performing the processing on the image of the user in the smart mirror upon the determining is positive.

20 Claims, 3 Drawing Sheets

SLIDE RAIL

IMAGING PROCESSING METHOD FOR SMART MIRROR, AND SMART MIRROR

CROSS-REFERENCE TO RELATED APPLICATION

This application claims priority to Chinese patent application No. 201810040917.2 filed Jan. 16, 2018, the disclosure which is incorporated herein by reference in its entirety.

BACKGROUND

In daily lives, people often look into the mirror. When looking into the mirror, he or she has to get closer to the mirror surface if the user wants to see a partial imaging of his/her face.

SUMMARY

The present disclosure relates to the field of electronic technology, and more particularly, to an imaging processing method for a smart mirror, and a smart mirror.

The inventors of the resent disclosure have recognized that, if other items (such as the sink or the like) are placed between the user and the mirror surface, the user will be impeded from approaching the mirror surface, and therefore may not be able to see the imaging in the mirror clearly. Various embodiments of the present disclosure can overcome such problems.

According to a first aspect of the embodiments of the present disclosure, there is provided an imaging processing method for a smart mirror. The method includes:

obtaining biometric parameters of a user;

determining whether to perform a processing on an image of the user in the smart mirror according to the biometric parameters, wherein the processing includes an enlargement processing or a reduction processing; and performing the processing on the image of the user in the smart mirror upon the determining is positive, i.e., in a case of "yes."

In this way, the smart mirror can automatically recognize the user's needs according to the user's biometric parameters and perform corresponding imaging processing. Even if there are other items (such as the sink or the like) between the user and the mirror surface, the user will not be impeded from seeing the imaging in the mirror surface clearly due to not being able to come closer to the mirror surface.

In some embodiments, the biometric parameters include a moving state of the user in a direction of a mirror face of the smart mirror;

said "determining whether to perform a processing on an imaging of the user in the smart mirror according to the biometric parameters, and performing the processing on the imaging of the user in the smart mirror, in a case of "yes," includes:

determining to perform the enlargement processing on the imaging of the user in the smart mirror when detecting a movement of the user towards the smart mirror in the direction of the mirror face of the smart mirror; and determining to perform the reduction processing on the imaging of the user in the smart mirror when detecting a movement of the user away from the smart mirror in the direction of the mirror face of the smart mirror.

In the implementation, when the user cannot see his/her own imaging in the mirror face clearly, he/she approaches the mirror face. When the smart mirror detects a movement of the user towards the smart mirror in the direction of the mirror face of the smart mirror, an enlargement processing on the imaging of the user in the smart mirror is determined to perform. Conversely, when the user feels that the enlarged image displayed in the mirror face is too large, he/she can step back in a direction of the mirror face of the smart mirror. When the smart mirror detects a movement of the user away from the smart mirror in the direction of the mirror face of the smart mirror, a reduction processing on the imaging of the user in the smart mirror is determined to perform.

In some embodiments, the biometric parameters include a state of a pupil.

Said "determining whether to perform a processing on an imaging of the user in the smart mirror according to the biometric parameters, and performing the processing on the imaging of the user in the smart mirror, in a case of "yes," includes:

determining to perform the enlargement processing on the imaging of the user in the smart mirror when detecting that a pupil image is included in an image captured by an image acquisition component and that a pupil size in the pupil image is enlarged.

In the implementation, the smart mirror captures the scene facing the image acquisition component through the image acquisition component in real time, and detects the captured image. When the image captured by the image acquisition component includes the user image, the position of the user's pupil can be detected and the pupil size in the pupil image can be determined. The image acquisition component can capture the image at a preset time interval to obtain image frames. When the pupil image is included in several consecutive image frames and the pupil size in the pupil image is enlarged, an enlargement processing on the imaging of the user in the smart mirror is determined to perform.

In some embodiments, when the processing is the enlargement processing, said performing the processing on the imaging of the user in the smart mirror includes:

controlling the smart mirror to move in the direction of the mirror face; or obtaining an enlarged image of the user in the direction of the mirror face of the smart mirror, and displaying the enlarged image in the mirror face of the smart mirror.

In some embodiments, said controlling the smart mirror to move in the direction of the mirror face includes:

obtaining a preset displacement distance, and controlling the smart mirror to move in the direction of the mirror face by the preset displacement distance; or detecting through a distance detecting component a distance between the user and the smart mirror in the direction of the mirror face of the smart mirror; calculating a difference between the distance and a preset target distance, and controlling the smart mirror to move in the direction of the mirror face by the difference.

In the implementation, when determining that the enlargement processing is required, the smart mirror may only move by a preset displacement distance at a time, for example, only 10 cm at a time.

Alternatively, the user can set the target distance in a dedicated application in the mobile phone based on his or her preference. That is, each time the user needs the smart mirror to perform the enlargement processing, the smart mirror directly moves by the target distance preset by the user.

In some embodiments, said obtaining an enlarged image of the user in the direction of the mirror face of the smart mirror includes:

obtaining a preset target enlargement coefficient of image; obtaining an enlarged image of the user in the direction of the mirror face of the smart mirror, based on the target enlargement coefficient of image; or detecting through a distance detecting component a distance between the user and the smart mirror in the direction of the mirror face of the smart mirror; calculating a difference between the distance and a preset target distance, and determining a target enlargement coefficient of image corresponding to the currently calculated difference according to a pre-stored correspondence between the difference and the enlargement coefficient of image; and obtaining an enlarged image of the user in the direction of the mirror face of the smart mirror, based on the target enlargement coefficient of image.

When determining that the enlargement processing is required, the smart mirror may perform the enlargement processing based on the preset target enlargement coefficient of image at a time, and for example, the image is enlarged by 1.2 times at a time.

Alternatively, a difference between the distance $X_1$ and a preset target distance $X_2$ can be calculated, and the smart mirror is controlled to move in the direction of the mirror face by the difference, i.e., $X_1$-$X_2$. A target enlargement coefficient of image corresponding to the currently calculated difference $X_1$-$X_2$ is determined according to a pre-stored correspondence between the difference and the enlargement coefficient of image. An enlarged image of the user in the direction of the mirror face of the smart mirror is obtained based on the target enlargement coefficient of image.

In some embodiments, said obtaining an enlarged image of the user in the direction of the mirror face of the smart mirror based on the target enlargement coefficient of image includes:

detecting a position of a face image in the image acquired by the image acquisition component; and enlarging the image based on the target enlargement coefficient of image by centering on the position of the face image to obtain an enlarged image of the user in the direction of the mirror face of the smart mirror.

In some embodiments, said obtaining an enlarged image of the user in the direction of the mirror face of the smart mirror based on the target enlargement coefficient of image includes:

adjusting a focus length of the image acquisition component based on the target enlargement coefficient of image; and obtaining, by acquiring the image through the adjusted image acquisition component, an enlarged image of the user in the direction of the mirror face of the smart mirror.

In some embodiments, when the processing is the reduction processing, said performing the processing on the imaging of the user in the smart mirror includes:

controlling the smart mirror to move in a direction opposite to the direction which the mirror face faces; or obtaining a reduced image of the user in the direction of the mirror face of the smart mirror, and displaying the reduced image in the mirror face of the smart mirror.

In some embodiments, after performing the processing on the imaging of the user in the smart mirror, the method further includes:

if the processing on the imaging of the user in the smart mirror is determined again according to the biometric parameters of the user, and the determined processing is opposite to the preceding processing, setting a scaling ratio of the determined processing to be less than that of said preceding processing when performing the processing on the imaging of the user in the smart mirror for the present time.

According to a second aspect of the embodiments of the present disclosure, there is provided a smart mirror. The smart mirror includes:

an obtaining module, configured to obtain biometric parameters of a user; and a first processing module, configured to determine whether to perform a processing on an imaging of the user in the smart mirror according to the biometric parameters, wherein the processing includes an enlargement processing or a reduction processing; and the processing on the imaging of the user in the smart mirror is performed, in a case of "yes."

In some embodiments, the biometric parameters include a moving state of the user in a direction of the mirror face of the smart mirror; and the first processing module includes:

a first determining unit which is configured to determine to perform the enlargement processing on the imaging of the user in the smart mirror when detecting a movement of the user towards the smart mirror in the direction of the mirror face of the smart mirror; and a second determining unit which is configured to determine to perform the reduction processing on the imaging of the user in the smart mirror when detecting a movement of the user away from the smart mirror in the direction of the mirror face of the smart mirror.

In some embodiments, the biometric parameters include a state of a pupil; and the first processing module includes:

a third determining unit which is configured to determine to perform the enlargement processing on the imaging of the user in the smart mirror when detecting that a pupil image is included in an image captured by an image acquisition component and that a pupil size in the pupil image is enlarged.

In some embodiments, when the processing is the enlargement processing, the first processing module includes:

a first control unit, configured to control the smart mirror to move in the direction of the mirror face; or an enlarging unit, configured to obtain an enlarged image of the user in the direction of the mirror face of the smart mirror, and to display the enlarged image in the mirror face of the smart mirror.

In some embodiments, the first control unit is configured to:

obtain a preset displacement distance, and control the smart mirror to move in the direction of the mirror face by the preset displacement distance; or detect through a distance detecting component a distance between the user and the smart mirror in the direction of the mirror face of the smart mirror; calculate a difference between the distance and a preset target distance, and control the smart mirror to move in the direction of the mirror face by the difference.

In some embodiments, the enlarging unit is configured to:

obtain a preset target enlargement coefficient of image; obtain an enlarged image of the user in the direction of the mirror face of the smart mirror, based on the target enlargement coefficient of image; or detect through a distance detecting component a distance between the user and the smart mirror in the direction of the mirror face of the smart mirror; calculate a difference between the distance and a preset target distance, and determine a target enlargement coefficient of image corresponding to the currently calculated difference according to a pre-stored correspondence between the difference and the enlargement coefficient of image; and obtain an enlarged image of the user in the direction of the mirror face of the smart mirror, based on the target enlargement coefficient of image.

In some embodiments, the enlarging unit is configured to:

detect a position of a face image in the image acquired by the image acquisition component; and enlarge the image based on the target enlargement coefficient of image by centering on the position of the face image to obtain an enlarged image of the user in the direction of the mirror face of the smart mirror.

In some embodiments, the enlarging unit is configured to:

adjust a focus length of the image acquisition component based on the target enlargement coefficient of image; and obtain, by acquiring the image through the adjusted image acquisition component, an enlarged image of the user in the direction of the mirror face of the smart mirror.

In some embodiments, when the processing is the reduction processing, the first processing module includes:

a second control unit, configured to control the smart mirror to move in a direction opposite to the direction which the mirror face faces; or a reducing unit, configured to obtain a reduced image of the user in the direction of the mirror face of the smart mirror, and to display the reduced image in the mirror face of the smart mirror.

In some embodiments, the smart mirror further includes:

a second processing module configured to, when the processing on the imaging of the user in the smart mirror is determined again according to the biometric parameters of the user, and the determined processing is opposite to the preceding processing, set a scaling ratio of the determined processing to be less than that of said preceding processing, when performing the processing on the imaging of the user in the smart mirror for the present time.

According to a second aspect of the embodiments of the present disclosure, there is provided a smart mirror, which includes a processor and a memory, wherein the memory has stored therein at least one instruction, at least one piece of program, a code set, or an instruction set that are loaded and executed by the processor to implement the above described imaging processing method for a smart mirror.

According to a third aspect of the embodiments of the present disclosure, there is provided a computer readable storage medium having stored therein at least one instruction, at least one piece of program, a code set, or an instruction set that are loaded and executed by a processor to implement the above described imaging processing method for a smart mirror.

The technical solutions according to embodiments of the present disclosure may have the following beneficial effects:

the method according to embodiments of the present disclosure includes: obtaining biometric parameters of the user; determining whether to perform a processing on the image of the user in the smart mirror according to the biometric parameters, wherein the processing includes an enlargement processing or a reduction processing; and performing the processing on the image of the user in the smart mirror, in the case of "yes."

In this way, the smart mirror can automatically recognize the user's needs according to the user's biometric parameters and perform corresponding imaging processing. Even if there are other items (such as the sink or the like) between the user and the mirror surface, the user will not be impeded from seeing the imaging in the mirror surface clearly due to not being able to come closer to the mirror surface.

It is to be understood that, both the foregoing general description and the following detailed description describe only some embodiments by way of example, and are not restrictive of the present disclosure.

BRIEF DESCRIPTION OF THE DRAWINGS

In order to clearly illustrate the various embodiments provided in the present disclosure, the following are drawings that accompany the description of the embodiments.

It is noted that these drawings should be interpreted to serve illustrating purposes only, and that these drawings may represent just some, but not all, of embodiments of the present disclosure. For those of ordinary skill in the art, other embodiments that are based on the structures as described below and illustrated in these drawings may become obvious. As such, these other embodiments should be interpreted to be contained within the scope of the disclosure.

Specific embodiments of the present disclosure have been illustrated in the above drawings, and will be described in further detail hereinafter. The drawings and the description are not intended to limit the scope of the concept of the present disclosure in any way; instead, the concept of the disclosure is explained to those of ordinary skill in the art by making reference to the specific embodiments as examples.

DETAILED DESCRIPTION

Descriptions will now be made in detail with respect to some embodiments, examples of which are illustrated in the accompanying drawings. The following description refers to the accompanying drawings in which the same numbers in different drawings may represent the same or similar elements unless otherwise represented. Some implementations set forth in the following description of example embodiments do not represent all implementations consistent with the disclosure. Instead, they are merely examples of devices and methods consistent with aspects related to the disclosure as recited in the appended claims.

An imaging processing method for a smart mirror is provided according to embodiments of the present disclosure, which can be implemented by a smart mirror.

A smart mirror may include a mirror surface, a display component, a processor, a memory, and the like. The processor may be a central processing unit (CPU) or the like, and may be configured to acquire biometric parameters of the user. According to the biometric parameters, the processor may determine whether to perform a processing on the image of the user in the smart mirror. The memory may be a random-access memory (RAM), a flash memory, etc., and may be configured to store received data, data required for processing, data generated during processing, and the like, such as the biometric parameters of the user, etc.

The smart mirror may also include a transceiver, an input component, an audio output component, and the like. The transceiver can be used for data transmission with a mobile phone. For example, the transceiver can obtain the setting parameters sent from the mobile phone to the smart mirror. The transceiver may include a Bluetooth component, a wireless-fidelity (WiFi) component, an antenna, a matching circuit, a modem, etc. The input component may be a touch screen or the like. The audio output component may be a loudspeaker box or the like.

Figure 1:
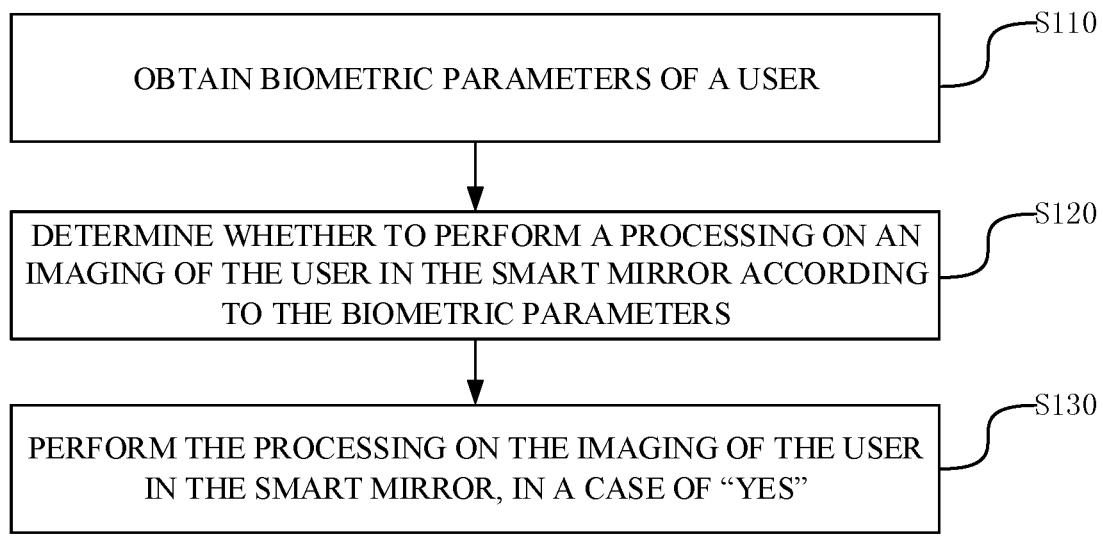
FIG. 1 is a flowchart illustrating an imaging processing method for a smart mirror according to some embodiments.

An imaging processing method for a smart mirror is provided according to some embodiments of the present disclosure. As shown in FIG. 1, the process of the method may include the following steps.

Step S110: obtaining biometric parameters of the user.

The biometric parameter is a parameter for characterizing a physiological reaction naturally generated by the user for visually achieving a certain requirement (purpose), and the characteristics presented by the parameter have universal applicability to different users. For example, if the user wants to see something far away, when the distance is too far to make it clearly seen, the pupil is usually enlarged naturally to try to see the distant things; or, for some people with nearsightedness, when they cannot clearly see things at a certain distance away, they tend to squint at the things more clearly. In this embodiment, the biometric parameters may include a moving state of the user in the direction of the mirror surface of the smart mirror, or a state of the pupil or the like. The moving state of the user in the direction of the mirror surface of the smart mirror is the user moving toward or away from the mirror surface. The state of the pupil is the pupil enlargement. When a person is staring at something, the pupil is enlarged to an enlargement threshold. For example, when a person is looking at the lens, the pupil is enlarged to an enlargement threshold.

Step S120: determining whether to perform a processing on an image of the user in the smart mirror according to the biometric parameters, wherein the processing includes an enlargement processing or a reduction processing.

In some implementations, when the user cannot see his/her own imaging in the mirror surface clearly, he/she approaches the mirror surface. When detecting a movement of the user towards the mirror surface of smart mirror, the smart mirror determines to perform an enlargement processing on the image of the user in the smart mirror. When the user is staring at the mirror surface, the pupil of the user is enlarged, and when detecting the enlargement of the pupil of the user, the smart mirror can also determine to perform an enlargement processing on the image of the user in the smart mirror. For another example, when the user is staring at the mirror surface, if the user squints, it is highly possible that the user is trying to see the image in the mirror clearly, and then an enlargement processing on the image of the user in the smart mirror can be determined. Conversely, when the user feels that the enlarged image displayed in the mirror surface is too large, he/she can step back in a direction of the mirror surface of the smart mirror. When the smart mirror detects a movement of the user away from the mirror surface of the smart mirror, a reduction processing on the image of the user in the smart mirror is determined.

Step S130: performing the processing on the image of the user in the smart mirror upon the determining is positive, i.e., in a case of "yes."

In some implementations, if the processing on the image of the user in the smart mirror is required, the method provided below by the present embodiment can be used.

In some embodiments, the biometric parameters include a moving state of the user in a direction of the mirror surface of the smart mirror. The step of "determining whether to perform a processing on an image of the user in the smart mirror according to the biometric parameters, and performing the processing on the image of the user in the smart mirror, in a case of "yes," may include: determining to perform the enlargement processing on the image of the user in the smart mirror when detecting a movement of the user towards the smart mirror in the direction of the mirror surface of the smart mirror; and determining to perform a reduction processing on the image of the user in the smart mirror when detecting a movement of the user away from the smart mirror in the direction of the mirror surface of the smart mirror.

In some implementations, when the user cannot see his/her own imaging in the mirror surface clearly, he/she approaches the mirror surface. When the smart mirror detects a movement of the user towards the smart mirror in the direction of the mirror surface of the smart mirror, an enlargement processing on the image of the user in the smart mirror is determined to perform. Conversely, when the user feels that the enlarged image displayed in the mirror surface is too large, he/she can step back in a direction of the mirror surface of the smart mirror. When the smart mirror detects a movement of the user away from the smart mirror in the direction of the mirror surface of the smart mirror, a reduction processing on the image of the user in the smart mirror is determined to perform. Specifically, an infrared distance measuring device or an ultrasonic device or the like may be disposed in the smart mirror. The infrared distance measuring device or the ultrasonic device can be used to detect the moving state of the user in the direction of the mirror surface of the smart mirror.

In some embodiments, the biometric parameters include a state of a pupil. The step of "determining whether to perform a processing on an image of the user in the smart mirror according to the biometric parameters, and performing the processing on the image of the user in the smart mirror, in a case of "yes," may include: determining to perform the enlargement processing on the image of the user in the smart mirror when detecting that a pupil image is included in an image captured by an image acquisition component and that a pupil size in the pupil image is enlarged.

In some implementations, the smart mirror captures the scene facing the image acquisition component through the image acquisition component in real time, and detects the captured image. When the image captured by the image acquisition component includes the user image, the position of the user's pupil can be detected and the pupil size in the pupil image can be determined. The image acquisition component can capture the image at a preset time interval to obtain image frames. When the pupil image is included in several consecutive image frames and the pupil size in the pupil image is enlarged, an enlargement processing on the image of the user in the smart mirror is determined to perform.

The way how the enlargement processing is implemented will be described below.

In some embodiments, when the processing is the enlargement processing, step S130 may include: controlling the smart mirror to move in the direction of the mirror surface; or obtaining an enlarged image of the user in the direction of the mirror surface of the smart mirror, and displaying the enlarged image in the mirror surface of the smart mirror.

Figure 2:
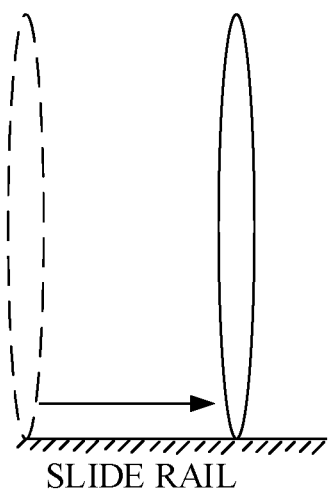
FIG. 2 is a schematic diagram illustrating the movement of a smart mirror according to some embodiments.

In some implementations, as shown in FIG. 2, a slide rail may be disposed at the bottom of the smart mirror, and an electric motor may also be installed in the smart mirror. Therefore, the motor can be controlled to operate and drive the smart mirror to move in a certain direction on the slide rail. The time duration of operation of the motor can be controlled so as to control the distance by which the smart mirror moves. The speed of the motor can be controlled so as to control the speed at which the smart mirror moves. By inputting pulses with different phases into the motor, the motor can be controlled to rotate clockwise or counterclockwise, and eventually to control the smart mirror to move in the direction which the mirror surface faces or in a direction opposite to the direction which the mirror surface faces.

In some embodiments, the step of controlling the smart mirror to move in the direction of the mirror surface may include: obtaining a preset displacement distance, and controlling the smart mirror to move in the direction of the mirror surface by the preset displacement distance; or detecting through a distance detecting component a distance between the user and the smart mirror in the direction of the mirror surface of the smart mirror; calculating a difference between the distance and a preset target distance, and controlling the smart mirror to move in the direction of the mirror surface by the difference.

In some implementations, when determining that the enlargement processing is required, the smart mirror may only move by a preset displacement distance at a time, for example, only 10 cm at a time.

Alternatively, the user can set the target distance in a dedicated application in the mobile phone based on his or her preference. That is, each time the user needs the smart mirror to perform the enlargement processing, the smart mirror directly moves by the target distance preset by the user. After the user sets the target distance, the mobile phone can send the set target distance to the smart mirror through network. When the smart mirror detects the requirement of enlargement processing, the smart mirror can detect through a distance detecting component a distance $X_1$ between the user and the smart mirror in the direction of the mirror surface of the smart mirror. A difference between the distance $X_1$ and the preset target distance $X_2$ is calculated, and the smart mirror is controlled to move in the direction of the mirror surface by the difference, i.e., $X_1-X_2$.

Figure 3:
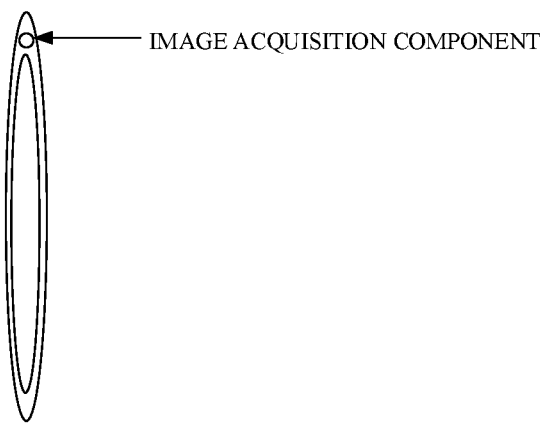
FIG. 3 is a schematic structural diagram illustrating a smart mirror according to some embodiments.

If the bottom of the smart mirror is not provided with a slide rail or the like, as shown in FIG. 3, the image of the user in the direction of the mirror surface of the smart mirror can be captured by the image acquisition component, the captured image of the user is enlarged and then is displayed in the mirror surface of the smart mirror.

In some embodiments, the step of obtaining an enlarged image of the user in the direction of the mirror surface of the smart mirror may include: obtaining a preset target enlargement coefficient of image; obtaining an enlarged image of the user in the direction of the mirror surface of the smart mirror, based on the target enlargement coefficient of image; or detecting through a distance detecting component a distance between the user and the smart mirror in the direction of the mirror surface of the smart mirror; calculating a difference between the distance and a preset target distance, and determining a target enlargement coefficient of image corresponding to the currently calculated difference according to a pre-stored correspondence between the difference and the enlargement coefficient of image; and obtaining an enlarged image of the user in the direction of the mirror surface of the smart mirror, based on the target enlargement coefficient of image.

In some implementations, when determining that the enlargement processing is required, the smart mirror may perform the enlargement processing based on the preset target enlargement coefficient of image at a time, and for example, the image is enlarged by 1.2 times at a time.

Alternatively, a difference between the distance $X_1$ and a preset target distance $X_2$ can be calculated, and the smart mirror is controlled to move in the direction of the mirror surface by the difference, i.e., $X_1-X_2$. A target enlargement coefficient of image corresponding to the currently calculated difference $X_1-X_2$ is determined according to a pre-stored correspondence between the difference and the enlargement coefficient of image. An enlarged image of the user in the direction of the mirror surface of the smart mirror is obtained based on the target enlargement coefficient of image.

In some embodiments, the step of obtaining an enlarged image of the user in the direction of the mirror surface of the smart mirror based on the target enlargement coefficient of image may include: detecting a position of a face image in the image acquired by the image acquisition component; and enlarging the image based on the target enlargement coefficient of image by centering on the position of the face image to obtain an enlarged image of the user in the direction of the mirror surface of the smart mirror In some implementations, the image may be enlarged by enlarging the face image of the user which is captured at an original magnification so as to obtain an enlarged image of the user in the direction of the mirror surface of the smart mirror.

In some embodiments, the step of obtaining an enlarged image of the user in the direction of the mirror surface of the smart mirror based on the target enlargement coefficient of image may include: adjusting the focus length of the image acquisition component based on the target enlargement coefficient of image; and obtaining, by acquiring the image through the adjusted image acquisition component, an enlarged image of the user in the direction of the mirror surface of the smart mirror.

In some implementations, the focus length of the image acquisition component can be adjusted, and the magnification for capturing the image can be adjusted by adjusting the focus length of the image acquisition component so that an enlarged image can be captured directly.

The above described is some implementations of the enlargement processing, and some implementations of the reduction processing will be described below.

In some embodiments, when the processing is the reduction processing, step S130 may include: controlling the smart mirror to move in a direction opposite to the direction which the mirror surface faces; or obtaining a reduced image of the user in the direction of the mirror surface of the smart mirror, and displaying the reduced image in the mirror surface of the smart mirror.

In some embodiments, the step of controlling the smart mirror to move in a direction opposite to the direction which the mirror surface faces may include: obtaining a preset displacement distance, and controlling the smart mirror to move in a direction opposite to the direction which the mirror surface faces by the preset displacement distance; or detecting through a distance detecting component a distance between the user and the smart mirror in the direction of the mirror surface of the smart mirror; calculating a difference between the distance and a preset target distance, and controlling the smart mirror to move in a direction opposite to the direction which the mirror surface faces by the difference.

In some embodiments, the step of obtaining a reduced image of the user in the direction of the mirror surface of the smart mirror may include: obtaining a preset target reduction coefficient of image; obtaining a reduced image of the user in the direction of the mirror surface of the smart mirror, based on the target reduction coefficient of image; or detecting through a distance detecting component a distance between the user and the smart mirror in the direction of the mirror surface of the smart mirror; calculating a difference between the distance and a preset target distance, and determining a target reduction coefficient of image corresponding to the currently calculated difference according to a pre-stored correspondence between the difference and the reduction coefficient of image; and obtaining a reduced image of the user in the direction of the mirror surface of the smart mirror, based on the target reduction coefficient of image.

In some embodiments, the step of obtaining a reduced image of the user in the direction of the mirror surface of the smart mirror based on the target reduction coefficient of image may include: adjusting the focus length of the image acquisition component based on the target reduction coefficient of image; and obtaining, by acquiring the image through the adjusted image acquisition component, a reduced image of the user in the direction of the mirror surface of the smart mirror.

In some implementations, the specific implementation of the reduction processing is similar to that of the enlargement processing; for the specific implementation of the reduction processing, reference may be made to the specific implementation of the enlargement processing, and no detailed repeated discussion will be given herein.

In some embodiments, after performing the processing on the image of the user in the smart mirror, the method provided by the present embodiment may further include: if the processing on the image of the user in the smart mirror is determined again according to the biometric parameters of the user, and the determined processing is opposite to the preceding processing, then setting the scaling ratio of determined processing to be less than that of said preceding processing when performing the processing on the image of the user in the smart mirror for the present time.

In some implementations, for example, if the smart mirror firstly determines, in a certain time period, that the enlargement processing is required, the enlargement ratio may be set to be 2 times, and when a reduction processing is determined to be required after this, the reduction ratio may be set to be 1.5 times. Then, when an enlargement processing is determined to be required again, the enlargement ratio may be set to be 1.2 times.

In some embodiments, after performing the processing on the image of the user in the smart mirror, the method provided by the present embodiment may further include: when the biometric parameters of the user are obtained again, determining whether to perform the processing on the image of the user in the smart mirror according to the biometric parameters of the user as obtained again, and performing the processing on the image of the user in the smart mirror in a case of "yes."

In some implementations, each time the enlargement processing or the reduction processing is completed, the biometric parameters of the user can be detected again, and it is determined whether to perform the processing on the image of the user in the smart mirror according to the biometric parameters of the user as obtained again. The processing on the image of the user in the smart mirror is performed in a case of "yes," until there is no need for the user to view the enlarged or reduced image.

The method provided by the present embodiment includes: obtaining biometric parameters of the user; determining whether to perform a processing on the image of the user in the smart mirror according to the biometric parameters, wherein the processing includes an enlargement processing or a reduction processing; and performing the processing on the image of the user in the smart mirror, in the case of "yes." In this way, the smart mirror can automatically recognize the user's needs according to the user's biometric parameters and perform corresponding imaging processing. Even if there are other items (such as the sink or the like) between the user and the mirror surface, the user will not be impeded from seeing the imaging in the mirror surface clearly due to not being able to come closer to the mirror surface. In addition, since the basis of determining adopted by the embodiment of the present disclosure is the biometric parameters of the user, which have universal applicability and is a refinement of the normal reaction of people, there is no difference for different users. Therefore, some implementations of the present disclosure do not require the user to learn in advance, which reduces the cost of learning. For example, the smart mirror of the present disclosure can be placed in a shopping mall or the like where there is a large flow of people, and there is no need to explain the method of using the mirror for each user. The user only needs to use it as a conventional mirror subjectively. When the biometric parameters of the user meet the condition for triggering imaging processing of the mirror, the processing will be automatically performed, thereby effectively improving the user experience and the fun of use.

Figure 4:
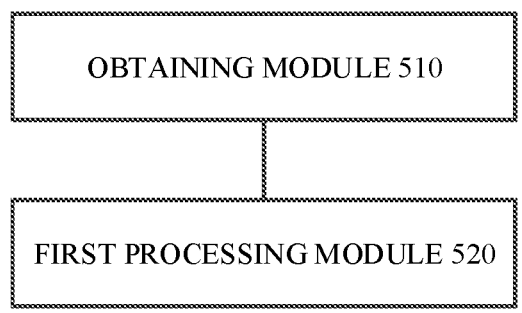
FIG. 4 is a schematic structural diagram illustrating a smart mirror according to some embodiments.

A smart mirror is provided according to another exemplary embodiment of the present disclosure. As shown in FIG. 4, the smart mirror includes:

an obtaining module 510, configured to obtain biometric parameters of the user;

a first processing module 520, configured to determine whether to perform a processing on the image of the user in the smart mirror according to the biometric parameters, wherein the processing includes an enlargement processing or a reduction processing; and the processing on the image of the user in the smart mirror is performed, in the case of "yes."

Figure 5:
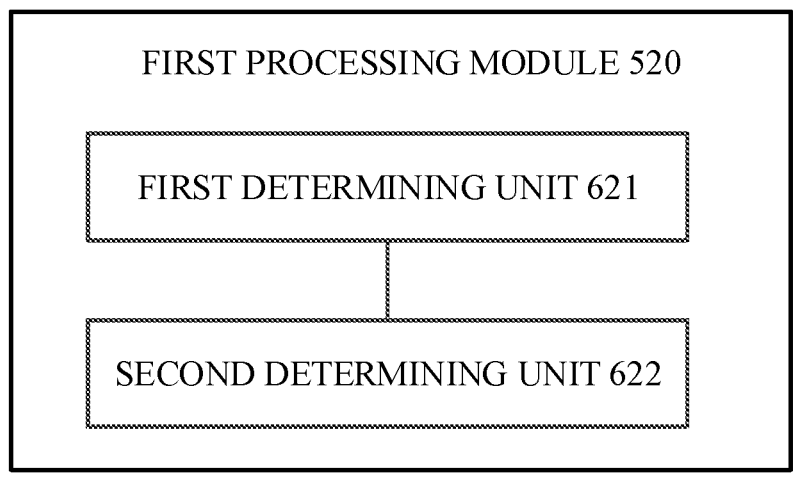
FIG. 5 is a schematic structural diagram illustrating a smart mirror according to some embodiments.

In some embodiments, the biometric parameters include a moving state of the user in a direction of the mirror surface of the smart mirror;

As shown in FIG. 5, the first processing module 520 includes:

a first determining unit 621 which is configured to determine to perform an enlargement processing on the image of the user in the smart mirror when detecting a movement of the user towards the smart mirror in a direction of the mirror surface of the smart mirror; and a second determining unit 622 which is configured to determine to perform a reduction processing on the image of the user in the smart mirror when detecting a movement of the user away from the smart mirror in a direction of the mirror surface of the smart mirror.

In some embodiments, the biometric parameters include a state of a pupil;

the first processing module 520 includes:

a third determining unit which is configured to determine to perform an enlargement processing on the image of the user in the smart mirror when detecting that a pupil image is included in an image captured by an image acquisition component and that the pupil size in the pupil image is enlarged.

In some embodiments, when the processing is the enlargement processing, the first processing module 520 includes:

a first control unit, configured to control the smart mirror to move in the direction of the mirror surface; or an enlarging unit, configured to obtain an enlarged image of the user in the direction of the mirror surface of the smart mirror, and to display the enlarged image in the mirror surface of the smart mirror.

In some embodiments, the first control unit is configured to:

obtain a preset displacement distance, and control the smart mirror to move in the direction of the mirror surface by the preset displacement distance; or detect through a distance detecting component a distance between the user and the smart mirror in the direction of the mirror surface of the smart mirror; calculate a difference between the distance and a preset target distance, and control the smart mirror to move in the direction of the mirror surface by the difference.

In some embodiments, the enlarging unit is configured to:

obtain a preset target enlargement coefficient of image; obtain an enlarged image of the user in the direction of the mirror surface of the smart mirror, based on the target enlargement coefficient of image; or detect through a distance detecting component a distance between the user and the smart mirror in the direction of the mirror surface of the smart mirror; calculate a difference between the distance and a preset target distance, and determine a target enlargement coefficient of image corresponding to the currently calculated difference according to a pre-stored correspondence between the difference and the enlargement coefficient of image; and obtain an enlarged image of the user in the direction of the mirror surface of the smart mirror, based on the target enlargement coefficient of image.

In some embodiments, the enlarging unit is configured to:

detect a position of a face image in the image acquired by the image acquisition component; and enlarge the image based on the target enlargement coefficient of image by centering on the position of the face image to obtain an enlarged image of the user in the direction of the mirror surface of the smart mirror.

In some embodiments, the enlarging unit is configured to:

adjust a focus length of the image acquisition component based on the target enlargement coefficient of image; and obtain, by acquiring the image through the adjusted image acquisition component, an enlarged image of the user in the direction of the mirror surface of the smart mirror.

In some embodiments, when the processing is the reduction processing, the first processing module 520 includes:

a second control unit, configured to control the smart mirror to move in a direction opposite to the direction which the mirror surface faces; or a reducing unit, configured to obtain a reduced image of the user in the direction of the mirror surface of the smart mirror, and to display the reduced image in the mirror surface of the smart mirror.

In some embodiments, the smart mirror further includes:

a second processing module configured to, when the processing on the image of the user in the smart mirror is determined again according to the biometric parameters of the user, and the determined processing is opposite to the preceding processing, set the scaling ratio of the determined processing to be less than that of said preceding processing, when performing the processing on the image of the user in the smart mirror for the present time.

The various device components, units, blocks, or portions may have modular configurations, or are composed of discrete components, but nonetheless may be referred to as "modules" in general. In other words, the "modules" or "units" referred to herein may or may not be in modular forms.

The various device components, units, blocks, portions, or modules may be realized with hardware, software, or a combination of hardware and software.

For the device in the above embodiment, the specific manners in which various modules operate have been described in detail in the embodiment relating to the above method, and therefore will not be repeated herein.

The smart mirror can automatically recognize the user's needs according to the user's biometric parameters and perform corresponding imaging processing. Even if there are other items (such as the sink or the like) between the user and the mirror surface, the user will not be impeded from seeing the imaging in the mirror surface clearly due to not being able to come closer to the mirror surface.

It should be noted that the smart mirror provided in the above embodiment is only illustrated through the division of the above functional modules when performing the imaging processing. In actual applications, the above functions can be distributed to different functional modules as required. That is, the internal structure of the smart mirror is divided into different functional modules to perform all or part of the functions described above. In addition, the smart mirror provided by the above embodiment belongs to the same concept as the embodiment of the imaging processing method for the smart mirror. The specific implementation process thereof has been described in detail in the method embodiment, and no detailed repeated discussion will be given herein.

A schematic structural diagram of a smart mirror is illustrated according to further another exemplary embodiment of the disclosure.

Figure 6:
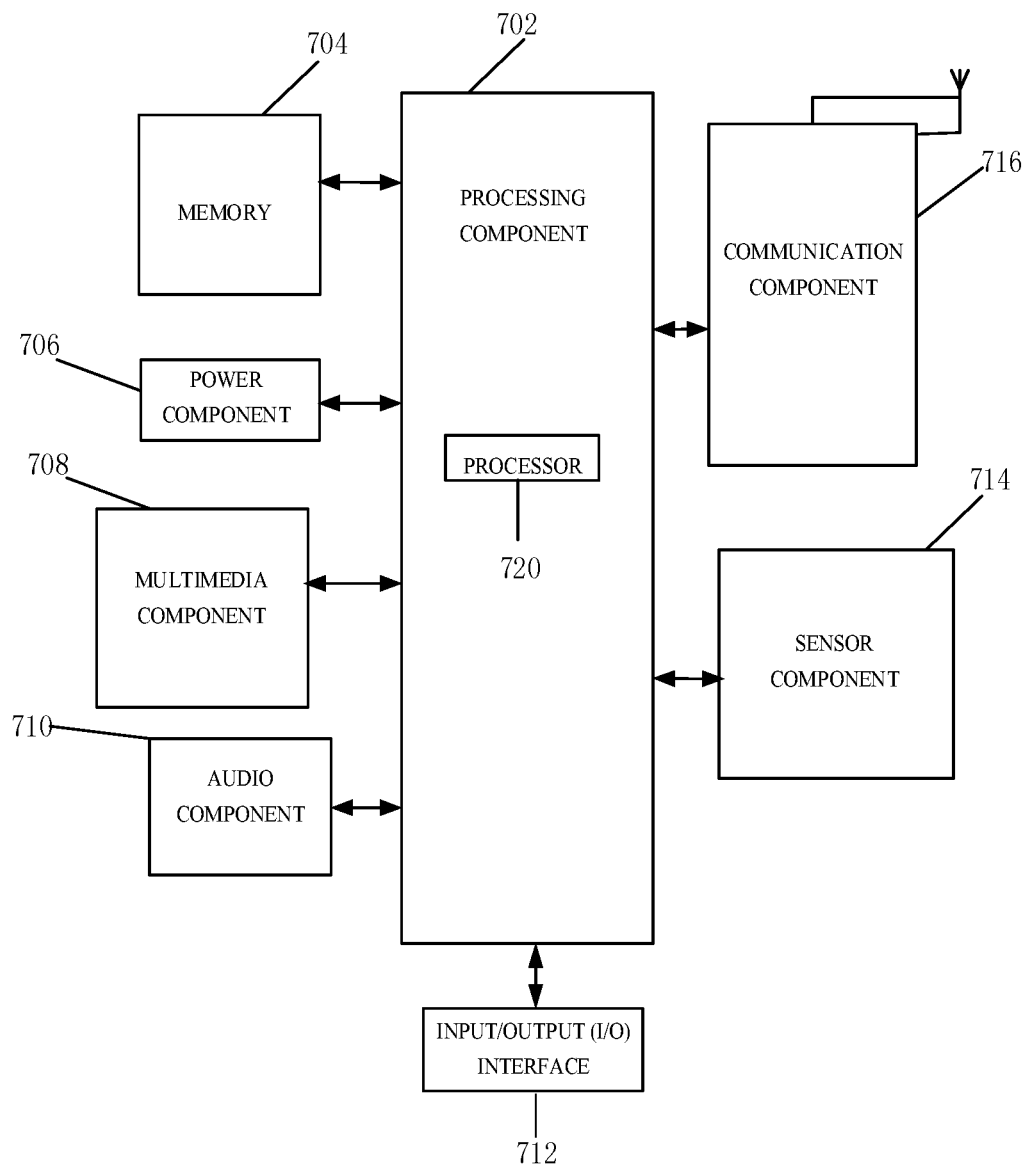
FIG. 6 is a schematic structural diagram illustrating a smart mirror according to some embodiments.

Referring to FIG. 6, the smart mirror 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the smart mirror 700, such as the operations associated with data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the smart mirror 700. Examples of such data include instructions for any applications or methods operated on the smart mirror 700, pictures, etc. The memory 704 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the smart mirror 700. The power component 706 may include a power management system, one or more power sources, and any other components associated with the generation, management, and distribution of power in the smart mirror 700.

The multimedia component 708 includes a screen providing an output interface between the smart mirror 700 and the user. In some embodiments, the screen may include a liquid crystal display (LCD) and a touch panel (TP).

In some implementations, the screen is not limited to the LCD display, but can include, for example, a light-emitting diode (LED) display, an OLED (organic LED) display, a flexible display, etc.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the smart mirror 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the smart mirror 700 is in an operation mode, such as a call mode, a recording mode, and a voice recognition mode. The received audio signal may be further stored in the memory 704 or transmitted via the communication component 716.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the smart mirror 700. For instance, the sensor component 714 may detect an open/closed status of the smart mirror 700, relative positioning of components, e.g., the display and the keypad, of the smart mirror 700, a change in position of the smart mirror 700 or a component of the smart mirror 700, a presence or absence of user contact with the smart mirror 700, an orientation or an acceleration/deceleration of the smart mirror 700, and a change in temperature of the smart mirror 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the smart mirror 700 and other devices. The smart mirror 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the smart mirror 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In some embodiments, there is also provided a computer-readable storage medium including instructions, such as included in the memory 704, executable by the processor 720 in the smart mirror 700, for performing the above described method. For example, the non-transitory computer-readable storage medium may be a ROM, a RAM, a CD-ROM, a magnetic tape, a floppy disc, an optical data storage device, and the like.

According to some other embodiments of the present disclosure, there is provided a non-transitory computer-readable storage medium; when the instructions stored therein are executed by the processor of the smart mirror, the smart mirror can execute the instructions executed by the smart mirror in the above embodiment.

In the description of the present disclosure, the terms "one embodiment," "one implementation," "some embodiments," "some implementations," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Therefore, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An imaging processing method for a smart mirror, comprising:
   obtaining biometric physical parameters of a user with at least one of an image acquisition component, a distance detecting component, an infrared distance measuring device, and an ultrasonic device;
   determining whether to perform a processing on an image of the user obtained by and displayed in the smart mirror according to the biometric physical parameters, wherein the processing comprises an enlargement processing or a reduction processing;
   performing the processing on the image of the user in the smart mirror upon the determining is positive; and
   upon that the processing on the image of the user in the smart mirror is determined again according to the biometric physical parameters of the user, and the determined processing is opposite to a preceding processing on the image of the user, setting a scaling ratio of the determined processing to be less than that of the preceding processing when performing the processing on the image of the user in the smart mirror for the present time.

2. The method according to claim 1, wherein:
   the biometric physical parameters comprise a moving state of the user in a direction of a mirror surface of the smart mirror; and
   the method further comprises:
   determining to perform the enlargement processing on the image of the user in the smart mirror upon detecting a movement of the user towards the smart mirror in the direction of the mirror surface of the smart mirror; and
   determining to perform the reduction processing on the image of the user in the smart mirror upon detecting a movement of the user away from the smart mirror in the direction of the mirror surface of the smart mirror.

3. The method according to claim 1, wherein:
   the biometric physical parameters comprise a state of a pupil; and
   the method further comprises:
   determining to perform the enlargement processing on the image of the user in the smart mirror upon detecting that a pupil image is contained in an image captured by the image acquisition component and that a pupil size in the pupil image is enlarged.

4. The method according to claim 1, wherein in a case that the processing is the enlargement processing, the performing the processing on the image of the user in the smart mirror comprises at least one of:
   controlling the smart mirror to toward the user; and
   enlarging the image of the user and displaying the enlarged image in the mirror surface of the smart mirror.

5. The method according to claim 4, wherein the controlling the smart mirror to move in the direction of the mirror surface comprises:
   obtaining a preset displacement distance, and controlling the smart mirror to move in the direction of the mirror surface by the preset displacement distance; or
   detecting, with the distance detecting component, a distance between the user and the smart mirror in the direction of the mirror surface of the smart mirror; calculating a difference between the distance and a preset target distance, and controlling the smart mirror to move in the direction of the mirror surface by the difference.

6. The method according to claim 4, wherein the obtaining an enlarged image of the user in the direction of the mirror surface of the smart mirror comprises:
   obtaining a preset target enlargement coefficient of image; obtaining an enlarged image of the user in the direction of the mirror surface of the smart mirror, based on the target enlargement coefficient of image; or
   detecting, with the distance detecting component, a distance between the user and the smart mirror in the direction of the mirror surface of the smart mirror; calculating a difference between the distance and a preset target distance, and determining a target enlargement coefficient of image corresponding to the currently calculated difference according to a pre-stored correspondence between the difference and the enlargement coefficient of image; and obtaining an enlarged image of the user in the direction of the mirror surface of the smart mirror, based on the target enlargement coefficient of image.

7. The method according to claim 6, wherein the obtaining an enlarged image of the user in the direction of the mirror surface of the smart mirror based on the target enlargement coefficient of image comprises:
   detecting a position of a face image in the image acquired by the image acquisition component; and
   enlarging the image based on the target enlargement coefficient of image by centering the image of the user on the position of the face image to obtain an enlarged image of the user in the direction of the mirror surface of the smart mirror.

8. The method according to claim 6, wherein the obtaining an enlarged image of the user in the direction of the mirror surface of the smart mirror based on the target enlargement coefficient of image comprises:
   adjusting a focal length of the image acquisition component based on the target enlargement coefficient of image; and
   obtaining, by acquiring the image through the adjusted image acquisition component, an enlarged image of the user in the direction of the mirror surface of the smart mirror.

9. The method according to claim 1, wherein in a case that the processing is the reduction processing, the performing the processing on the image of the user in the smart mirror comprises:
- controlling the smart mirror to move away from the user; or
- obtaining a reduced image of the user in the direction of the mirror surface of the smart mirror, and displaying the reduced image in the mirror surface of the smart mirror.

10. The method according to claim 1, wherein the biometric physical parameters comprise a size of user eyes, and the method further comprises:
- determining to perform the enlargement processing on the image of the user in the smart mirror upon detecting that the user is squinting eyes trying to see the image in the smart mirror clearly.

11. A smart mirror, comprising a processor and memory, wherein the memory has stored therein at least one instruction, at least one piece of program, a code set, or an instruction set that are loaded and executed by the processor to implement an imaging processing method for the smart mirror, wherein the method comprises:
- obtaining biometric physical parameters of a user with at least one of an image acquisition component, a distance detecting component, an infrared distance measuring device, and an ultrasonic device;
- determining whether to perform a processing on an image of the user obtained by and displayed in the smart mirror according to the biometric physical parameters, wherein the processing comprises an enlargement processing or a reduction processing;
- performing the processing on the image of the user in the smart mirror upon the determining is positive; and
- upon that the processing on the image of the user in the smart mirror is determined again according to the biometric physical parameters of the user, and the determined processing is opposite to a preceding processing on the image of the user, setting a scaling ratio of the determined processing to be less than that of the preceding processing when performing the processing on the image of the user in the smart mirror for the present time.

12. The smart mirror according to claim 11, wherein:
the biometric physical parameters comprise a moving state of the user in a direction of a mirror surface of the smart mirror; and
the method further comprises:
- determining to perform the enlargement processing on the image of the user in the smart mirror upon detecting a movement of the user towards the smart mirror in the direction of the mirror surface of the smart mirror; and
- determining to perform the reduction processing on the image of the user in the smart mirror upon detecting a movement of the user away from the smart mirror in the direction of the mirror surface of the smart mirror.

13. The smart mirror according to claim 11, wherein:
the biometric physical parameters comprise a state of a pupil; and
the method further comprises:
- determining to perform the enlargement processing on the image of the user in the smart mirror upon detecting that a pupil image is contained in an image captured by the image acquisition component and that a pupil size in the pupil image is enlarged.

14. The smart mirror according to claim 11, wherein in a case that the processing is the enlargement processing, the performing the processing on the image of the user in the smart mirror comprises at least one of:
- controlling the smart mirror to move toward the user; and
- enlarging the image of the user and displaying the enlarged image in the mirror surface of the smart mirror.

15. The smart mirror according to claim 14, wherein the controlling the smart mirror to move toward the user comprises:
- obtaining a preset displacement distance, and controlling the smart mirror to move toward the user by the preset displacement distance; or
- detecting through the distance detecting component a distance between the user and the smart mirror in the direction of the mirror surface of the smart mirror; calculating a difference between the distance and a preset target distance, and controlling the smart mirror to move in the direction of the mirror surface by the difference.

16. The smart mirror according to claim 14, wherein the enlarging the image of the user comprises:
- obtaining a preset target enlargement coefficient of image; obtaining an enlarged enlarging the image of the user based on the target enlargement coefficient of image; or
- detecting through the distance detecting component a distance between the user and the smart mirror in the direction of the mirror surface of the smart mirror; calculating a difference between the distance and a preset target distance, and determining a target enlargement coefficient of image corresponding to the currently calculated difference according to a pre-stored correspondence between the difference and the enlargement coefficient of image; and obtaining an enlarged image of the user in the direction of the mirror surface of the smart mirror, based on the target enlargement coefficient of image.

17. The smart mirror according to claim 16, wherein the enlarging the image of the user based on the target enlargement coefficient of image comprises:
- detecting a position of a face image in the image acquired by the image acquisition component; and
- enlarging the image based on the target enlargement coefficient of image by centering the image of the user on the position of the face image to obtain an enlarged image of the user in the direction of the mirror surface of the smart mirror.

18. The smart mirror according to claim 16, wherein the enlarging the image of the user based on the target enlargement coefficient of image comprises:
- adjusting a focus length of the image acquisition component based on the target enlargement coefficient of image; and
- obtaining, by acquiring the image through the adjusted image acquisition component, an enlarged image of the user in the direction of the mirror surface of the smart mirror.

19. The smart mirror according to claim 11, wherein in a case that the processing is the reduction processing, the performing the processing on the image of the user in the smart mirror comprises:
- controlling the smart mirror to move away from the user; or
- reducing the image of the user displaying the reduced image in the mirror surface of the smart mirror.

20. A non-transitory computer-readable storage medium, having stored therein at least one instruction, at least one piece of program, a code set, or an instruction set that are loaded and executed by a processor to implement an imaging processing method for a smart mirror, wherein the method comprises:

obtaining biometric physical parameters of a user with at least one of an image acquisition component, a distance detecting component, an infrared distance measuring device, and an ultrasonic device;

determining whether to perform a processing on an image of the user obtained by and displayed in the smart mirror according to the biometric physical parameters, wherein the processing comprises an enlargement processing or a reduction processing;

performing the processing on the image of the user in the smart mirror upon the determining is positive; and upon that the processing on the image of the user in the smart mirror is determined again according to the biometric physical parameters of the user, and the determined processing is opposite to a preceding processing on the image of the user, setting a scaling ratio of the determined processing to be less than that of the preceding processing when performing the processing on the image of the user in the smart mirror for the present time.

* * * * *